(12) United States Patent
Li

(10) Patent No.: US 7,092,159 B2
(45) Date of Patent: *Aug. 15, 2006

(54) POLARIZATION RECOVERY SYSTEM FOR PROJECTION DISPLAYS

(75) Inventor: Kenneth K. Li, Arcadia, CA (US)

(73) Assignee: Wavien, Inc., Santa Clarita, CA (US)

( * ) Notice: Subject to any disclaimer, the term of this patent is extended or adjusted under 35 U.S.C. 154(b) by 28 days.

This patent is subject to a terminal disclaimer.

(21) Appl. No.: 10/850,467

(22) Filed: May 21, 2004

(65) Prior Publication Data

US 2004/0257655 A1    Dec. 23, 2004

Related U.S. Application Data

(63) Continuation of application No. 10/347,522, filed on Jan. 21, 2003, now Pat. No. 6,982,830, which is a continuation of application No. 09/814,970, filed on Mar. 23, 2001, now Pat. No. 6,587,269.

(60) Provisional application No. 60/227,312, filed on Aug. 24, 2000, provisional application No. 60/246,583, filed on Nov. 8, 2000.

(51) Int. Cl.
*G02B 27/28* (2006.01)
*G02B 5/30* (2006.01)
(52) U.S. Cl. ............... 359/496; 359/494; 359/837; 385/11; 349/9; 353/20
(58) Field of Classification Search ........ 359/494–497, 359/487, 837; 353/20; 385/11; 349/9
See application file for complete search history.

(56) References Cited

U.S. PATENT DOCUMENTS 4,173,412 A * 11/1979 Ramsay et al. .............. 356/33

5,122,895 A * 6/1992 Takanashi et al. .......... 359/247

(Continued)

FOREIGN PATENT DOCUMENTS

CA    2290860    5/2000

(Continued)

*Primary Examiner*—Leonidas Boutsikaris
(74) *Attorney, Agent, or Firm*—Fulbright & Jaworski LLP

(57) ABSTRACT

A waveguide polarization recovery system both polarizes the input light energy for use with an LCD imager and converts the polarity of unusable light energy to add to the illumination of the LCD imager. The compact polarization recovery waveguide system generally includes: (1) an input waveguide that provides non-polarized light energy into the system; (2) an output waveguide that receives polarized light energy from the system; (3) a polarized beam splitter that received the light energy from the input waveguide and transmits lights energy of a first polarization type and reflects light energy of a second polarization type, and (4) a wave plate that modifies the polarization of either the transmitted or reflected light energy. The polarization recovery system also generally includes one or more mirrors that are positioned as need to direct the transmitted and the reflected light energy to the output waveguide. The input and output waveguides may be shaped as needed by the projection system. For example, either one or both of the input and output waveguides may be tapered as needed to produce a desired image. In the waveguide polarization recovery system, the input and output waveguides are configured to have either an either a substantially parallel or a substantially perpendicular orientation. In another embodiment, the waveguide polarization recovery system further includes has one or more "gaps" of optically clear material positioned between the optical components to encourage the occurrence of total internal reflection that minimizes the loss of the optical energy by the system.

17 Claims, 10 Drawing Sheets

U.S. PATENT DOCUMENTS

| | | | |
|---|---|---|---|
| 5,301,030 A | | 4/1994 | Ko |
| 5,303,083 A | * | 4/1994 | Blanchard et al. ........... 359/495 |
| 5,513,023 A | | 4/1996 | Fritz et al. |
| 5,625,738 A | * | 4/1997 | Magarill ...................... 359/503 |
| 5,712,694 A | | 1/1998 | Taira et al. |
| 5,751,480 A | * | 5/1998 | Kitagishi .................... 359/487 |
| 5,786,873 A | | 7/1998 | Chiu et al. |
| 5,884,991 A | * | 3/1999 | Levis et al. ................. 353/122 |
| 5,995,284 A | * | 11/1999 | Vanderwerf ................. 359/487 |
| 6,053,615 A | * | 4/2000 | Peterson et al. .............. 353/20 |
| 6,104,454 A | | 8/2000 | Hiyama et al. |
| 6,139,157 A | * | 10/2000 | Okuyuma .................... 353/20 |
| 6,160,665 A | * | 12/2000 | Yuan ........................... 359/629 |
| 6,247,814 B1 | | 6/2001 | Lin |
| 6,374,025 B1 | * | 4/2002 | Iriyama et al. .............. 385/117 |
| 6,587,269 B1 | * | 7/2003 | Li ............................... 359/497 |
| 6,752,963 B1 | * | 6/2004 | Dickopf et al. ........... 422/82.09 |
| 2002/0012101 A1 | * | 1/2002 | Takeuchi et al. ............... 353/31 |
| 2005/0036203 A1 | * | 2/2005 | Ferri et al. ................... 359/501 |

FOREIGN PATENT DOCUMENTS

| | | |
|---|---|---|
| EP | 584 802 A1 | 3/1994 |
| EP | 0 691 552 A2 | 1/1996 |
| JP | 9-326205 | 12/1997 |
| WO | WO 93/24857 A1 | 12/1993 |
| WO | WO 95/27919 A2 | 10/1995 |

* cited by examiner

POLARIZATION RECOVERY SYSTEM FOR PROJECTION DISPLAYS

CROSS REFERENCE TO RELATED APPLICATIONS

The present application is a continuation of application Ser. No. 10/347,522, filed Jan. 21, 2003, now U.S. Pat. No. 6,982,830 which is a continuation of application Ser. No. 09/814,970, filed Mar. 23, 2001, now U.S. Pat. No. 6,587,269, which claims benefit of U.S. Provisional Application Nos. 60/227,312, filed Aug. 24, 2000 and 60/246,583, filed Nov. 8, 2000.

FIELD OF INVENTION

The present invention relates an improved system and methodology for substantially increasing the light output of a polarized optical projection system through the recovery of optical energy of an unused polarization.

BACKGROUND OF INVENTION

A liquid crystal display (hereafter "LCD") is a known device used to control the transmission of polarized light energy. The LCD may be either clear or opaque, depending on the current applied to the LCD. Because of this functionality, projection systems commonly use an array containing numerous LCDs to form an image source. In particular, the projection system inputs high intensity, polarized light energy to the LCD array (also called an imager), which selectively transmits some of the inputted light energy to form a projection of a desired image. Because a single LCD is relatively small, numerous LCDs can be packed together into the array, thereby forming an imager that can produce a high resolution image.

As suggested above, a projection system must first polarize the light input to the LCD. However, light energy from a light source, such as a bulb, may have either p-polarization or s-polarization. Since this light input to the LCD imager must be in one orientation (i.e., either p-polarization or s-polarization), the LCD projector generally uses only half of the light energy from the light source. However, it is desirable in projection systems to maximize the brightness and intensity of the light output. In response, various methodologies have been developed to capture the light energy of unusable polarization, to convert the polarization of this captured light energy, and then to redirect the converted light energy toward the LCD imager. These known polarization recovery methodologies involve creating an expanded beam of light in which the unused portion of the light (of undesired polarity) is sent through a half-wave plate to change the polarization and then recombined with the original polarized beam. Unfortunately, the implementation of these known methodologies requires complex, bulky systems, which usually include 2-dimensional lense arrays and an array of polarization beam splitters. Furthermore, the known methodologies lose much of the light energy and, therefore, compromise the projector's goal of producing a high intensity output. As a result, there exists a current need for a simple, low cost, and compact polarization recovery system that operates with high efficiency.

SUMMARY OF THE INVENTION

In response to these needs, the present invention uses a waveguide system to perform the polarization recovery function in an LCD projection system. In particular, the present invention's waveguide polarization recovery system both polarizes the input light energy for use with an LCD imager and converts the polarity of unusable light energy to add to the illumination of the LCD imager. The compact polarization recovery waveguide system generally includes the following optical components that are integrated into a single unit: (1) an input waveguide that inputs non-polarized light energy into the system; (2) an output waveguide that removes polarized light energy from the system; (3) a polarized beam splitter that receives the light energy from the input waveguide and transmits light energy of a first polarization type and reflects light energy of a second polarization type, and (4) a wave plate that modifies the polarization of either the transmitted or reflected light energy. The polarization recovery system also generally includes one or more mirrors that are positioned as needed to direct the transmitted and/or reflected light energy to the output waveguide. The input and output waveguides may be shaped as needed by the projection system. For example, either one or both of the input and output waveguides may be tapered as needed to produce a desired image.

In the waveguide polarization recovery system, the input and output waveguides are configured to have either a substantially parallel or a substantially perpendicular orientation. In configurations in which the input and output waveguides are substantially parallel, the output waveguide directly receives light energy transmitted by the beam splitter. In this way, light energy enters and exits the polarization recovery system in substantially the same direction. Alternatively, the input and the output waveguides may be positioned substantially perpendicular to each other such that the light energy exits the polarization recovery system at a right angle from the direction it enters. In configurations having input and output waveguides of perpendicular orientation, a mirror receives the light energy transmitted by the polarized beam splitter and redirects this energy by 90° toward the output waveguide.

The polarization recovery waveguide system of the present invention combines the above-enumerated list of optical components into a single, compact unit. In one embodiment, the waveguide polarization recovery system further includes one or more "gaps" of optically clear material positioned between the optical components to encourage the occurrence of total internal reflection that minimizes the loss of the optical energy by the system.

BRIEF DESCRIPTION OF THE DRAWINGS

These and other advantages of the present invention will be described in detail with reference to the following drawings in which like reference numbers refer to like elements.

DETAILED DESCRIPTIONS OF THE PREFERRED EMBODIMENTS

Figure 1:
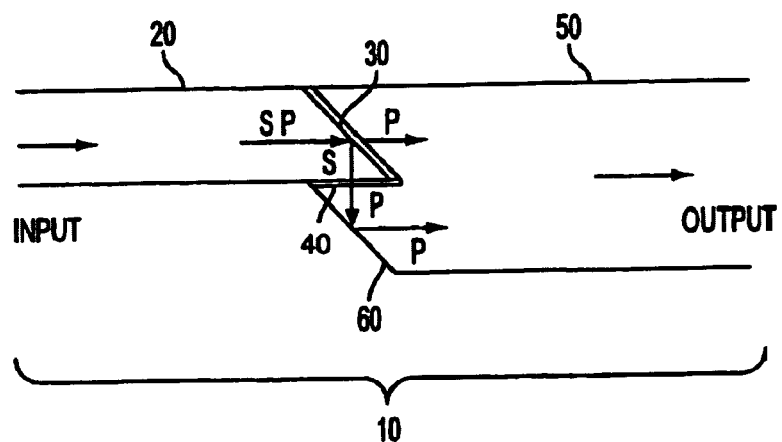
FIGS. 1–4 and 6–10 are schematic diagrams that illustrate various embodiments of the waveguide polarization recovery system of the present invention.
Figure 2:
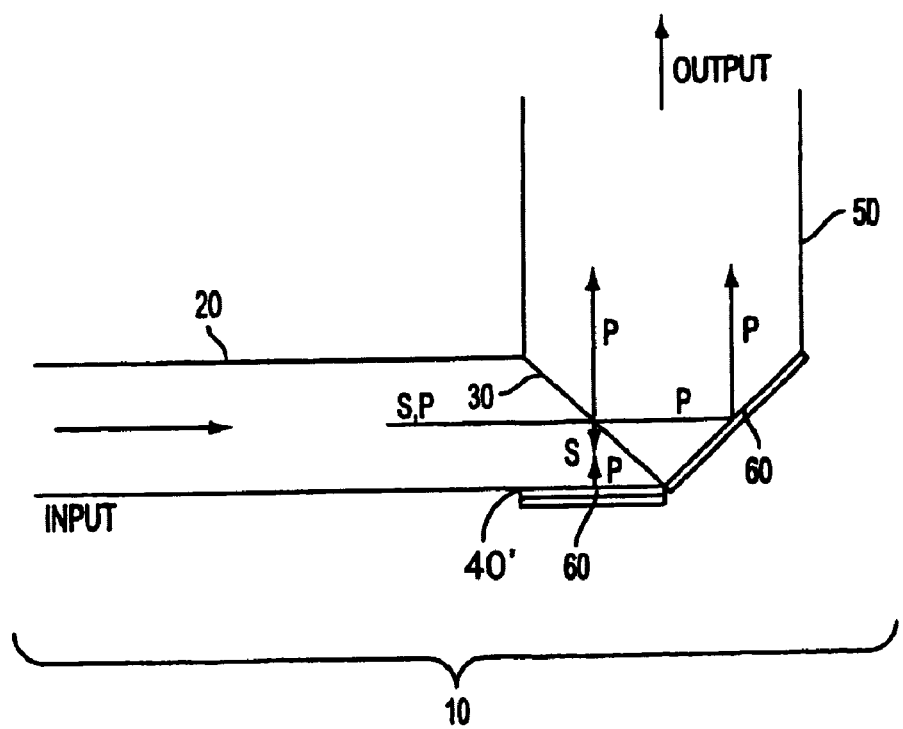

As illustrated in FIGS. 1–4 and 6–10, the present invention is a compact waveguide polarization recovery system 10 having an input waveguide 20, a polarizing beam splitter ("PBS") 30, a wave plate 40, which can be a half-wave plate, or a quarter-wave plate depending on the configuration, and an output waveguide 50. The waveguide polarization recovery system 10 generally further includes mirrors 60 as needed to direct the light stream between the input and output waveguides, 20 and 50. The following discussion first summarizes several possible configurations for the waveguide polarization recovery system 10 and then describes the individual elements in greater detail.

Figure 3:
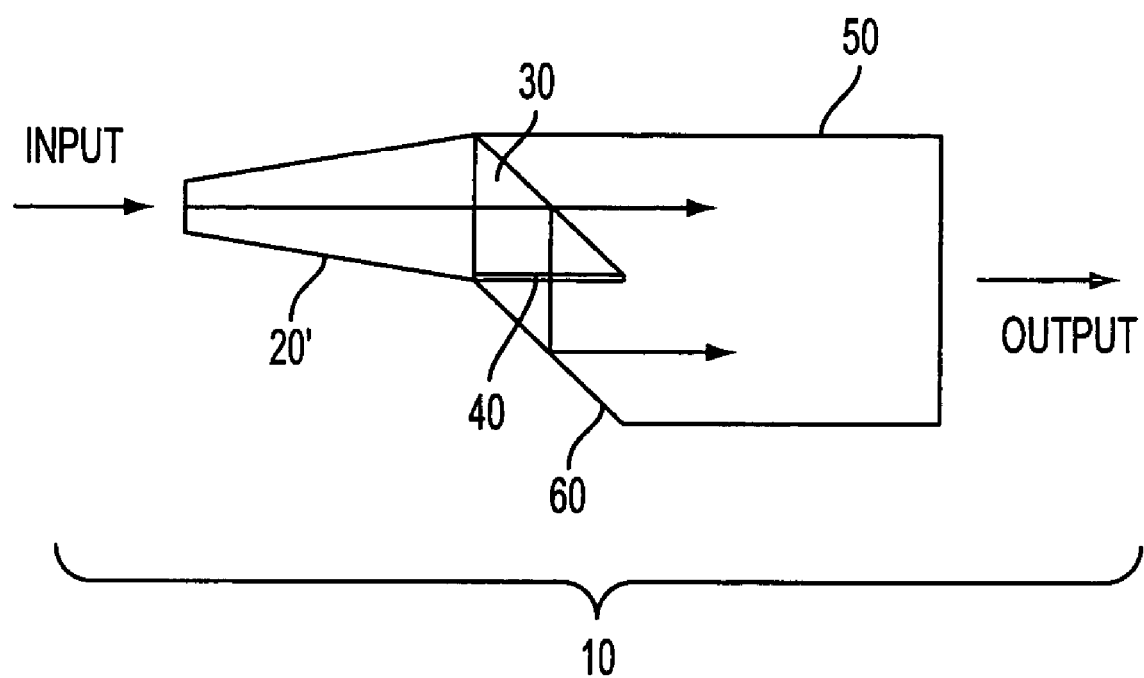
Figure 4:
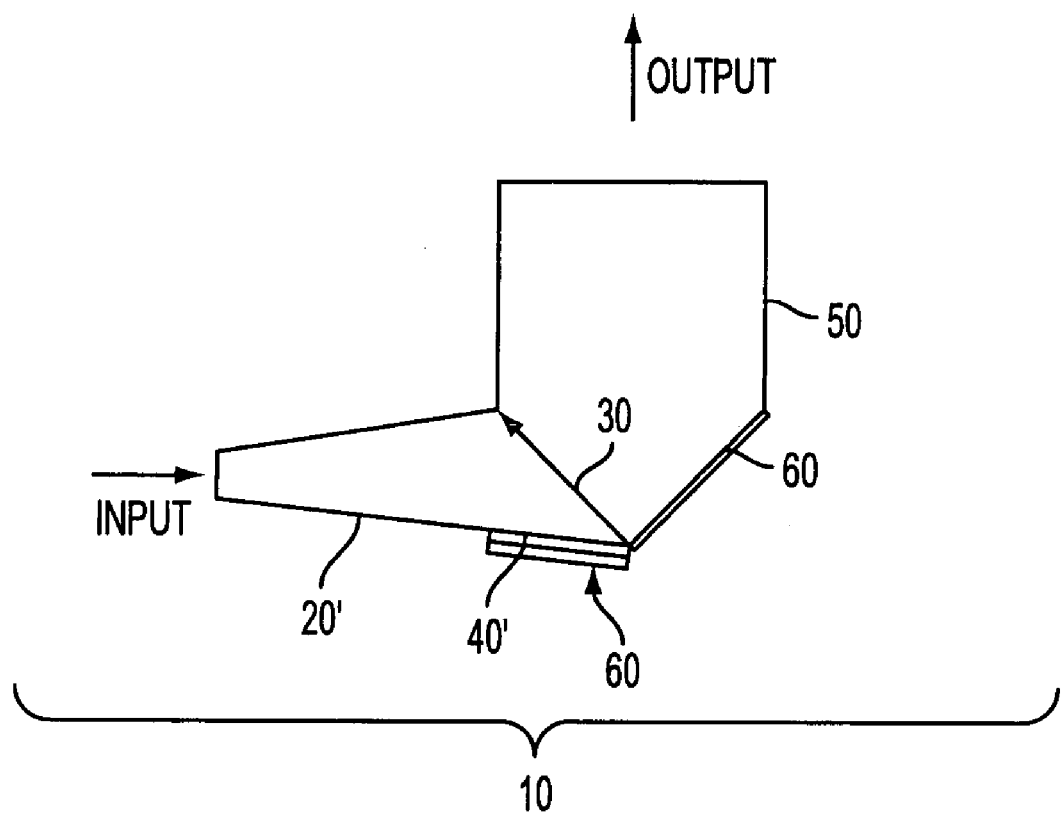
Figure 6:
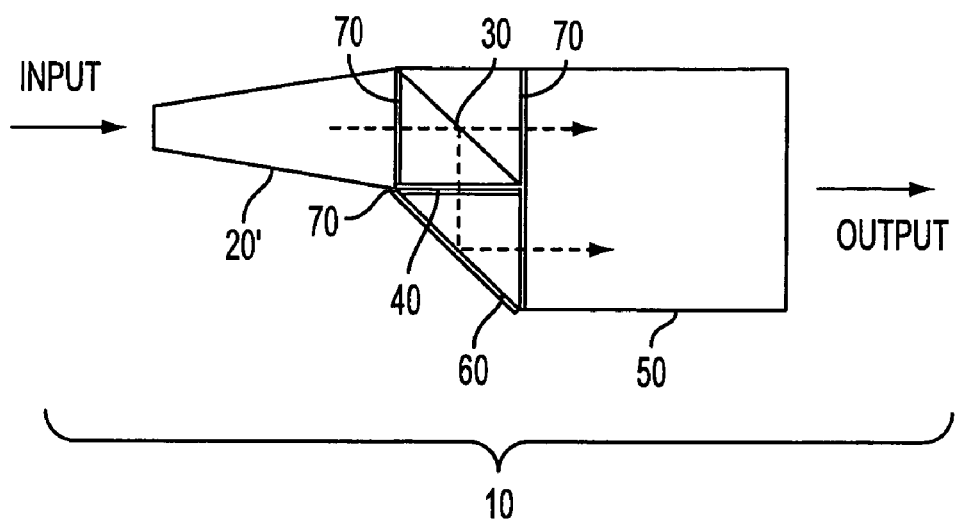

FIGS. 1, 3, and 6 illustrate one configuration of the waveguide polarization recovery system 10 in which the output light energy is substantially parallel with the input light energy. In this embodiment, the input waveguide 20 introduces unpolarized input light at incidence to the PBS 30. The illustrated PBS 30 transmits p-polarized light, and so the p-polarized portion of the input light energy continues through in the same direction as the initial input while the s-polarized light is reflected in a perpendicular direction to the initial direction of input. The half-wave plate 40 is positioned to receive the reflected s-polarized light and convert it to p-polarized. Subsequently, mirror 60 redirects the converted energy from the half-wave plate 40 back to the initial direction of input. Both the transmitted light energy from the PBS 30 and the converted light energy from the half-wave plate 40 are recombined in the output waveguide and mixed. As a result, the output light energy has a uniform intensity profile and is polarized. It should be appreciated that an output of the opposite polarization may be produced through the use of a PBS 30 that only transmits s-polarized light.

FIGS. 2, 4, and 7–8 illustrate another embodiment of the waveguide polarization recovery system 10 that has an alternative configuration in which the output light energy is perpendicular to the original input light energy. As in the embodiment of FIG. 1, the input waveguide 20 introduces unpolarized input light at incidence to the PBS 30. Furthermore, the PBS 30 performs the same function of transmitting the p-polarized light, and so the p-polarized portion of the input light energy continues through in the same direction as the initial input while the s-polarized light is reflected in a perpendicular direction to the initial direction of input. However, in the configuration of FIG. 2, one mirror 60 redirects the transmitted p-polarized portion of the input light energy by 90° toward the output waveguide 50. Furthermore, the reflected s-polarized light from the PBS 30 propagates once through a quarter-wave plate 40', and a second mirror 60 then returns the reflected light energy to the quarter-wave plate 40' for another pass. The second pass is also in the direction of the output waveguide 50. Because the reflected s-polarized light passes twice through the quarter-wave plate 40', s-polarized light is shifted by a half-wave to become p-polarized twice with the mirror as shown. Again, both p-polarized outputs will be mixed in the output waveguide, producing a uniform intensity output. The embodiment of FIG. 2 requires only two optical sections: A first section formed through the combination of the input waveguide 20, the PBS 30, the quarter-wave plate 40' and a mirror 60; and a second section formed through the combination of the output waveguide 50 and a second mirror 60. Therefore, the system has a simple design and a relatively low cost. Positioning the output light energy perpendicular to the original input light energy also has the advantage of allowing a more compact projection system, as described in greater detail below.

In contrast to the above-described configuration in which the wave plate 40 modifies the light emery reflected by the PBS 30, other configurations for the waveguide polarization recovery system 10 position the wave plate to modify the light energy transmitted by the PBS 30. For example, FIGS. 9 and 10 illustrate configurations in which the half-wave plate 40 is positioned to receive light energy transmitted by the PBS 30. In the configuration of FIG. 9, the half-wave plate 40 is optically positioned between a mirror 60' and the output waveguide 50. The half-wave plate 40 receives transmitted light energy that has first been redirected by a mirror 60'. Similarly, in FIG. 10, the half-wave plate 40 is placed between the PBS 30 and mirror 60'. In this way, the transmitted light energy from the PBS 30 is first repolarized between being redirected toward the output waveguide 50. The configuration of FIGS. 9–10 are advantageous because the input light energy only passes through the polarization layer of the PBS 30 once, thus reducing the loss of optical energy in the system 10. In contrast, the above-described configuration of the FIGS. 2, 4, and 7–8 requires some of the input light energy to pass through the PBS 30 twice.

Elements of the Waveguide Polarization Recovery System

The various configurations of the waveguide polarization recovery system 10 use the same elements, which are now described in greater detail.

The input waveguide 20 is typically an integrator that collects the light from a light source, such as an arc lamp, and mixes the light through multiple reflections to produce a more uniform intensity profile into the waveguide polarization recovery system 10. Likewise, the output waveguide 50 is typically an integrator that collects the light from the waveguide polarization recovery system 10 and mixes the light through multiple reflections to produce a more uniform intensity profile for illumination of the imager. The input waveguide 20 and the output waveguide 50 may be, for example, single core optic fibers, fused bundles of optic fibers, fiber bundles, solid or hollow square or rectangular light pipes, or homogenizers, which can be tapered or un-tapered. In optical projection systems, the input waveguide 20 and the output waveguide 50 are typically rectangular in cross-section to correspond with the shape of the imager and the final projected image. The input waveguide 20 and the output waveguide 50 wave can be made from glass, quartz, or plastic depending on the power-handling requirement.

Either one or both of the input waveguide 20 and the output waveguide 50 can have an increasing or decreasing taper as needed for the projection system. For example, FIG. 3–4 and 6–10 illustrate embodiments of the waveguide polarization recovery system 10 in which the input waveguide 20' is a tapered rod with the input cross-section matched to the area of the light source and the output cross-section related to the dimensions of a LCD imager. The final dimensions for the input waveguide 20 may vary as needed to minimize stray light loss in the optical projection system. Similarly, FIG. 8 illustrates an embodiment of the waveguide polarization recovery system 10 in which the output waveguide 50' is also tapered. Tapering of the output waveguide 50' is advantageous because, depending on the performance parameters of the PBS 30, the wave plate 40, and the output requirements for the projection system, polarization recovery may not always be done at the same numerical aperture as the output aperture. The performances of the PBS 30 and the wave plate 40 are better at smaller numerical apertures, and as a result, advantageous increases in performance are achieved by transforming the input light energy into a larger area with a small numerical aperture and then transforming the light energy back into larger numerical apertures at the output of the output waveguide 50'. Overall, the tapering of the input wave guide 20 and the output waveguide 50 can be selected to match the overall performance requirements of the projection system, and similarly, the input and output waveguides can be tapered in either direction.

The waveguide polarization recovery system 10 further includes PBS 30. The PBS 30 is a well-known optical element that transmits light energy of one polarization while reflecting light energy of a different polarization. Typically, the PBS 30 is a rectangular prism of optically clear material, such as plastic or glass, that has a polarizing coating applied to the diagonal surface. Alternatively, the PBS 30 may be composed of a material that selectively transmit light energy depending on the polarization of the light energy. However, it should be appreciated that there exist numerous alternative designs and types of PBS, and any of these alternative PBS's may be employed in the waveguide polarization recovery system 10 of the present invention. Because the PBS 30 is a well known and commercially available item, it is not discussed further.

Another element of the waveguide polarization recovery system 10 is the wave plate 40. The wave plate 40 is an optically transparent component that modifies the polarization of light energy that passes through the wave plate 40. The wave plate 40 typically changes the propagating of light in one axis, thus changes the polarization. The wave plate 40 may be either a half-wave or quarter-wave as needed by the specific configuration of the waveguide polarization recovery system 10. Overall, the wave plate 40 is a well known and commonly available item and will not be discussed further.

The waveguide polarization recovery system 10 may further include one or more mirrors 60 as needed to direct the light energy through the waveguide polarization recovery system 10. While mirrors are commonly known to be metal-coated glass surfaces or polished metal, the mirrors 60 should not be limited to this common definition for the purpose of this invention. Instead, mirrors 60 should be considered any optical component capable of reflecting or redirecting light energy. For example, mirrors 60 may be prisms that use the angle of incidence to capture and redirect light energy. For example, FIGS. 9 and 10 illustrate a waveguide polarization recovery system 10 that has a prism to redirect light energy transmitted by the PBS 30 toward the output waveguide 50. For systems with small numerical apertures, total internal reflection at the prism can be used, and as a result, the coating is not necessary.

Figure 7:
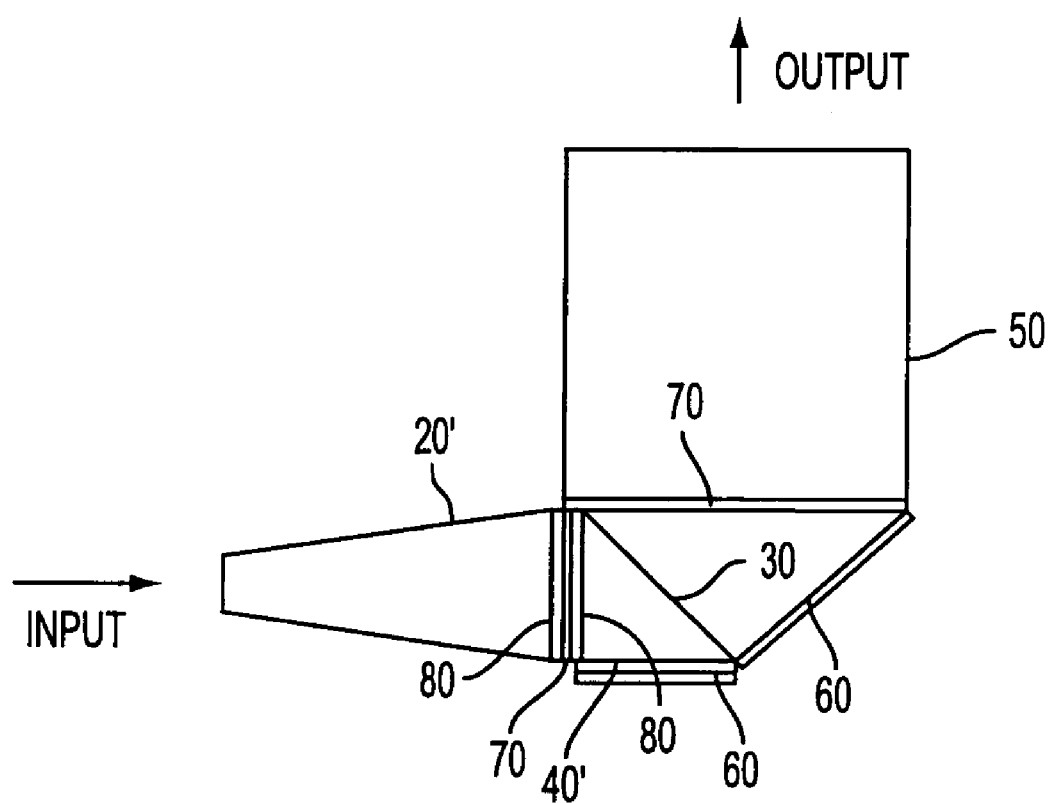
Figure 8:
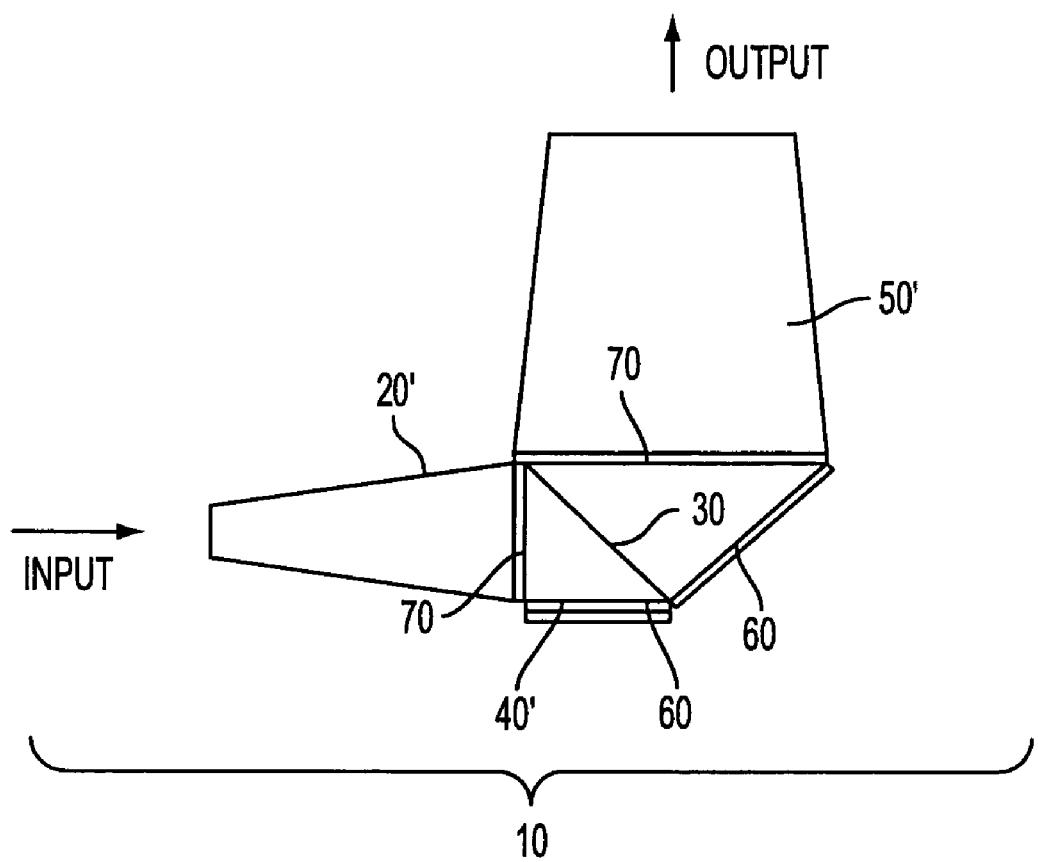
Figure 9:
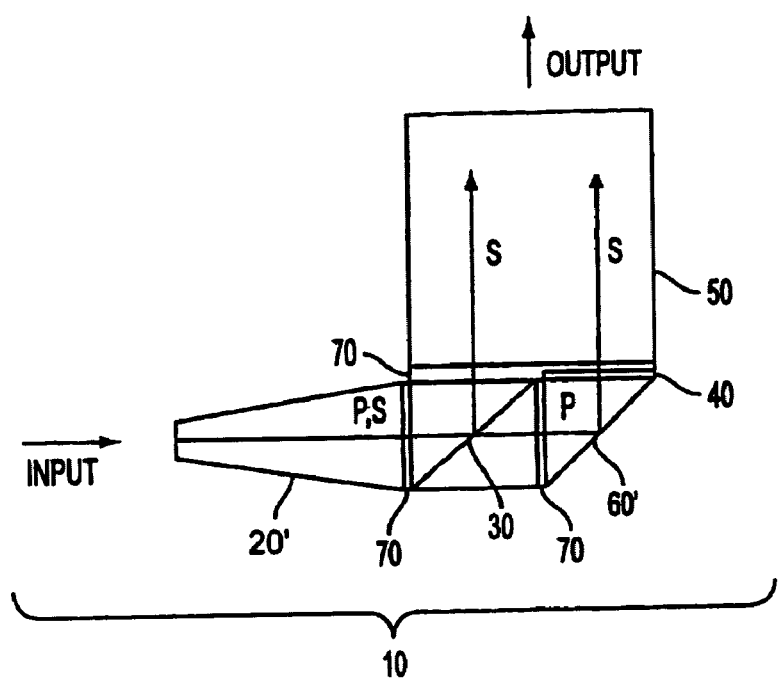
Figure 10:
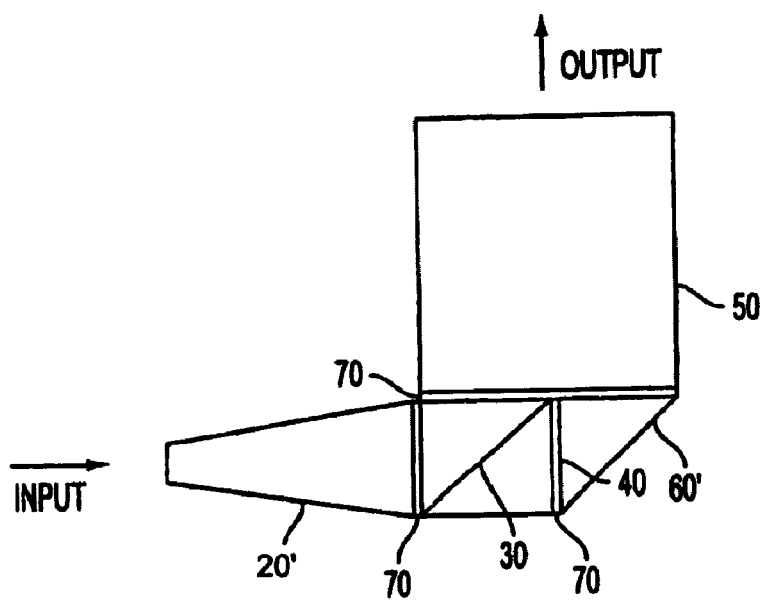

In another preferred embodiment of the present invention, illustrated in FIGS 6–10, the waveguide polarization recovery system 10 further includes one or more optically clear areas, or "gaps," 70 between the other optical elements. The gaps 70 may be pockets of air left between the optical components. The gap 70 can also be filled with low index epoxy or other transparent material such that the total internal reflection still occurs, but the assembly of the components will be simplified. For example, FIG. 6 illustrates a configuration having gap 70 between the input waveguide 20 and the PBS 30. This gap 70 ensures that light energy reflected by the diagonal PBS 30 is turned by 90° toward the half-wave plate 40 because total internal reflection from the interface between the PBS 30 and the gap 70 prevents the light energy from returning instead of the input waveguide 20 and exiting as a loss. The waveguide polarization recovery system 10 in FIG. 6 also has other gaps 70 to promote total internal reflection between the different optical elements. Similarly, FIG. 7 illustrates a waveguide polarization recovery system 10 in which gaps 70 have been added to a polarization recovery system with a tapered input waveguide 20 and perpendicularly configured output waveguide 50 illustrated in FIG. 4. Again these gaps 70 increase the efficiency by encouraging total internal reflection between the optical components. As illustrated in FIGS. 6–7, the gaps 70, while increasing the efficiency of the system, cause the waveguide polarization recovery system 10 to become more complex with an increased number of discrete parts.

In the above-described configurations of FIG. 9–10, the gaps 70 further serve the purpose of improving the performance of the prism 60' that serves as a mirror to direct the light energy toward the output waveguide 50. In particular, the gap 70 is needed between the PBS 30 and the prism 60' such that the light reflected from the hypotenuse of the prism 60', back toward the PBS 30, hits this interface of the gap 70 and is internally reflected toward the output waveguide 50. In this way, efficiency of the system is improved by minimizing loss.

The performance advantages of the gaps 70 may be further increased through the use of anti-reflection coating on both surfaces such that the transmitted light suffers minimal loss.

Figure 5:
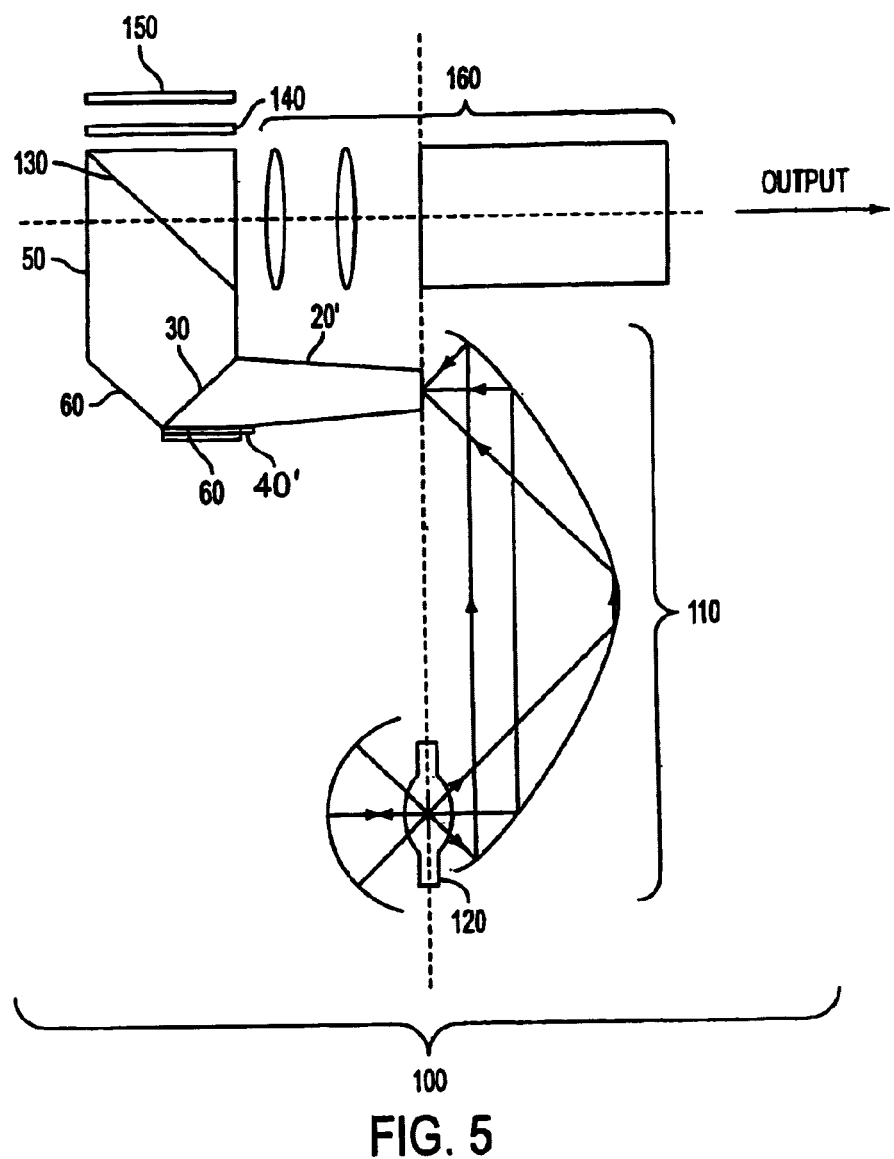
FIG. 5 is a schematic diagram that illustrates a compact projection device that uses one embodiment of the polarization recovery system of the present invention.

FIG. 5 illustrates a projector 100 that employs the waveguide polarization recovery system 10. The projector 100 consists of a light collecting system 110, which in this illustrated example has two paraboloid reflectors and a retro-reflector that increase the output by reflecting the light from a light source 120 back into itself. The arc of the light source 120 is placed at a focus of the first paraboloid reflector and the proximal end of the input waveguide 20 is at the focus of the second paraboloid reflector. It should be appreciated that this light collection system 110 is provided merely for illustration, and many other light collection systems are known and may be used. Likewise, the light source 120 may be an arc lamp, such as xenon, metal-halide lamp, HID, or mercury lamps, or a filament lamp, such as a halogen lamp, provided that the system is modified to accommodate the non-opaque filaments of the lamp.

Within the illustrated projector 100, the input waveguide 20 is a tapered light pipe that is designed to match the light input collected from the light collecting system 110 to the optical needs of an LCD imager 150. As described above in FIG. 4, the light output of the input waveguide 20 is polarized by the PBS 30 and the other polarization is recovered by the quarter-wave plate 40'. The output waveguide 50 then directs the polarized optical energy toward the LCD imager 150. In this case, the light output in the output waveguide 50 is then incident into a second PBS 130 whose orientation is matched to the polarization of the incident light to minimize the loss. A color wheel 140, or other type of color selection system, and the reflective LCD imager 150 create the projected image by the projection lenses 160 in a traditional manner. As shown in FIG. 5, the number of optical elements is minimal and, as the result, the cost for the projector is relatively low.

It should be appreciated that the waveguide polarization recovery system 10 may be used in other types of projection systems. For example, the projector may also use two or three imagers 150 to define the projected image. The imager 150 may also be a reflective display using liquid crystal on silicon ("LCOS") technology, or any other type of systems that requires polarized light. Similarly, the color wheel 140 can also be replaced by electrically switchable color system without moving parts or other known color projection systems.

While the invention has been described with reference to the structures disclosed herein, it is not confined to the details set forth, and this application is intended to cover such modifications or changes as may come within the purposes of the improvements or the scope of the following claims.

What is claimed is:

1. A polarization recovery system comprising:
   a polarizing beam splitter positioned to receive a substantial portion of light energy from a light source, the polarizing beam splitter transmitting light energy of a first polarization type and reflecting light energy of a second polarization type;
   a prism positioned to receive a substantial portion of either the transmitted light energy or the reflected light energy, said prism directing either said reflected or said transmitted light energy in an output direction;
   a gap between said polarizing beam splitter and said prism; and
   an output waveguide positioned to receive a substantial portion of both the transmitted light energy and the reflected light energy.

2. The polarization recovery system of claim 1, a polarization shifter positioned to receive and modify the polarization of a substantial portion of either the transmitted or the reflected light energy from the prism.

3. The polarization recovery system of claim 1, further comprising an input waveguide positioned to receive the light energy from the light source and emit light energy to the polarizing beam splitter.

4. The polarization recovery system of claim 3, wherein the input waveguide is tapered.

5. The polarization recovery system of claim 2, further comprising an optical gap between a pair of optical elements selected from a group consisting of: the light source and the polarizing beam splitter, and the polarizing beam splitter and the polarization shifter.

6. The polarization recovery system of claim 1, wherein the gap is filled with one of the following material: air, clear epoxy, and low-index epoxy.

7. The polarization recovery system of claim 1, further comprising an anti-reflection coating on a surface of the light source, the polarizing beam splitter, the polarization shifter, or the prism.

8. The polarization recovery system of claim 1, wherein the output waveguide is tapered.

9. The polarization recovery system of claim 1, further comprising:
   an imager positioned to receive a substantial portion of both the transmitted light energy and the reflected light energy; and
   a projection lens positioned to receive the light energy from the imager.

10. The polarization recovery system of claim 9, wherein said imager is an array of liquid crystal displays ("LCDs").

11. The polarization recovery system of claim 1, wherein the polarizing beam splitter comprises a rectangular prism.

12. The polarization recovery system of claim 2, wherein said first polarization type is substantially S-polarization and said second polarization type is substantially P-polarization.

13. The polarization recovery system of claim 12, wherein said polarization shifter changes said S-polarization to substantially said P-polarization.

14. The polarization recovery system of claim 12, wherein said polarization shifter changes said P-polarization to substantially said S-polarization.

15. The polarization recovery system of claim 2, wherein said first polarization type is substantially P-polarization and said second polarization type is substantially S-polarization.

16. The polarization recovery system of claim 15, wherein said polarization shifter changes said S-polarization to substantially said P-polarization.

17. The polarization recovery system of claim 15, wherein said polarization shifter changes said P-polarization to substantially said S-polarization.

* * * * *